United States Patent
Pannell et al.

(10) Patent No.: US 10,519,256 B2
(45) Date of Patent: Dec. 31, 2019

(54) SUPPORTED CATALYST COMPOSITIONS HAVING IMPROVED FLOW PROPERTIES AND PREPARATION THEREOF

(71) Applicant: Univation Technologies, LLC, Houston, TX (US)

(72) Inventors: Richard B. Pannell, Kingwood, TX (US); Chi-I Kuo, Humble, TX (US); Shamah Lloyd, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 74 days.

(21) Appl. No.: 15/569,788

(22) PCT Filed: Apr. 25, 2016

(86) PCT No.: PCT/US2016/029129
§ 371 (c)(1),
(2) Date: Oct. 27, 2017

(87) PCT Pub. No.: WO2016/176135
PCT Pub. Date: Nov. 3, 2016

(65) Prior Publication Data
US 2018/0134821 A1    May 17, 2018

Related U.S. Application Data

(60) Provisional application No. 62/153,321, filed on Apr. 27, 2015.

(51) Int. Cl.
| | | |
|---|---|---|
| C08F 4/64 | (2006.01) | |
| C08F 4/52 | (2006.01) | |
| C08F 4/76 | (2006.01) | |
| C08F 10/06 | (2006.01) | |
| C08F 10/02 | (2006.01) | |

(52) U.S. Cl.
CPC .............. *C08F 10/06* (2013.01); *C08F 10/02* (2013.01); *C08F 4/64* (2013.01); *C08F 4/76* (2013.01); *C08F 2410/01* (2013.01)

(58) Field of Classification Search
CPC ............................... C08F 4/65916; C08F 4/64
See application file for complete search history.

(56) References Cited

U.S. PATENT DOCUMENTS

| | | | |
|---|---|---|---|
| 8,742,041 B2* | 6/2014 | Pequeno | C08F 10/00 526/154 |
| 8,835,582 B2* | 9/2014 | Cann | C08F 10/02 526/226 |
| 2004/0097367 A1 | 5/2004 | Rodart et al. | |
| 2010/0298511 A1 | 11/2010 | Kuo et al. | |
| 2013/0253153 A1 | 9/2013 | Pequeno et al. | |
| 2017/0183434 A1* | 6/2017 | Pannell | C08F 210/16 |

FOREIGN PATENT DOCUMENTS

| | | |
|---|---|---|
| CN | 1235166 | 11/1999 |
| CN | 102453159 | 5/2012 |
| WO | 96/11961 | 4/1996 |

OTHER PUBLICATIONS

International Search Report & Written Opinion for related PCT Application PCT/US2016/029129, dated Aug. 12, 2016 (14 pgs).
Second Written Opinion for related PCT Application PCT/US2016/029129, dated Mar. 16, 2017 (9 pgs).
International Preliminary Report on Patentability for related PCT Application PCT/US2016/029129, dated May 29, 2017 (18 pgs).

* cited by examiner

*Primary Examiner* — Rip A Lee
(74) *Attorney, Agent, or Firm* — Brooks, Cameron & Huebsch, PLLC

(57) ABSTRACT

Supported catalyst compositions, useful in olefin polymerization, and having improved flow properties are disclosed. The catalyst compositions may be characterized by low macro pore volume and high bulk density. Methods for preparing the catalyst compositions are also disclosed.

18 Claims, No Drawings

SUPPORTED CATALYST COMPOSITIONS HAVING IMPROVED FLOW PROPERTIES AND PREPARATION THEREOF

This application is a National Stage Application under 35 U.S.C. § 371 of International Application Number PCT/US2016/029129, filed Apr. 25, 2016 and published as WO 2016/176135 on Nov. 3, 2016, which claims the benefit to U.S. Provisional Application 62/153,321, filed Apr. 27, 2015, the entire contents of which are incorporated herein by reference in its entirety.

FIELD

The present disclosure relates to supported catalyst compositions having improved flow properties, methods for their preparation and to their use in processes for polymerizing olefins. In particular, the disclosure relates to supported catalyst compositions comprising methylalumoxane activators and metallocene type catalyst compounds and/or conventional-type transition metal catalyst compounds which have improved flow properties.

BACKGROUND

Metallocene type catalysts are widely used to produce polyolefin polymers such as polyethylene polymers. They have provided efficient processes and a variety of new and improved polymers. While there are many advantages to using metallocene catalysts in olefin polymerizations, there remain significant challenges. For example, metallocene catalysts, in particular supported metallocene catalysts, often have poor flowability, and the supported catalyst particles tend to adhere to surfaces or form agglomerates. Adding other reagents to the supported catalyst composition, such as commonly known antifouling agents or continuity additives/aids may compound the flowability issue. This causes practical problems in storing, transporting, and then delivering the dry supported catalyst composition into a polymerization reactor.

Supported catalyst compositions may also have poor polymerization reactor operability, often caused by uneven distribution of catalyst active sites within the porous particles of the support. In particular, 'hot-spots' on the external surface of the support may result from such poor distribution, negatively affecting reactor operability.

It would be desirable to provide a supported catalyst composition for olefin polymerization that has good flowability and that may provide enhanced reactor operability.

SUMMARY

There is provided a supported catalyst composition for olefin polymerization comprising one or more particulate supports, one or more catalyst compounds, and one or more activator compounds, wherein the supported catalyst composition has a macro pore volume of less than or equal to 1.23 $cm^3/g$. The macro pore volume may be determined using mercury intrusion porosimetry according to ISO 15901-1.

In some embodiments macro pore volume may be characterized as the total volume of pores having a pore width greater than 0.05 µm.

The supported catalyst composition may have a macro pore volume of less than or equal to 1.20 $cm^3/g$, or less than or equal to 1.10 $cm^3/g$, or less than or equal to 1.00 $cm^3/g$, or less than or equal to 0.9 $cm^3/g$.

There is also provided a supported catalyst composition for olefin polymerization comprising one or more particulate supports, one or more catalyst compounds, and one or more activator compounds, wherein the supported catalyst composition has a tapped bulk density of greater than or equal to 0.30 $g/cm^3$, or greater than or equal to 0.35 $g/cm^3$, or greater than or equal to 0.40 $g/cm^3$ or greater than or equal to 0.45 $g/cm^3$.

There is also provided a supported catalyst composition for olefin polymerization comprising one or more particulate supports, one or more catalyst compounds, and one or more activator compounds, wherein the supported catalyst composition has a macro pore volume of less than or equal to 1.23 $cm^3/g$, or less than or equal to 1.10 $cm^3/g$, or less than or equal to 1.00 $cm^3/g$, or less than or equal to 0.9 $cm^3/g$ and a tapped bulk density of greater than or equal to 0.30 $g/cm^3$, or greater than or equal to 0.35 $g/cm^3$, or greater than or equal to 0.40 $g/cm^3$ or greater than or equal to 0.45 $g/cm^3$. The macro pore volume may be determined using mercury intrusion porosimetry according to ISO 15901-1.

There is also provided a supported catalyst composition for olefin polymerization comprising one or more particulate supports, one or more catalyst compounds, and one or more activator compounds, wherein the supported catalyst composition has an average macro pore width of less than or equal to 5 µm.

The supported catalyst composition may have an average macro pore width of less than or equal to 3 µm, or less than or equal to 2 µm, or less than or equal to 1 µm, or less than or equal to 0.5 µm.

The particulate support may be a particulate Group 2, 3, 4, 5, 13 and 14 oxide or chloride. The particulate support may be a particulate silica. The particulate support may be dehydrated at an elevated temperature.

The particulate support may have an average particle size in the range of from about 0.1 to about 500 µm, or from about 1 to about 200 µm, or from about 1 to about 50 µm, or from about 5 to about 50 µm.

The one or more activator compounds may be an organometallic compound. The one or more activator compounds may be an alumoxane or a neutral or ionic stoichiometric activator. The one or more activator compounds may be methylalumoxane or modified methylalumoxane.

There is also provided a supported catalyst composition for olefin polymerization comprising one or more particulate silica supports, one or more catalyst compounds, and one or more aluminum containing activator compounds, wherein the supported catalyst composition has a ratio of Al/Si on the external surface area of the support to Al/Si on the internal surface area of the support, of less than or equal to 3.0, or less than or equal to 2.5.

The one or more catalyst compounds may comprise a titanium, a zirconium, or a hafnium atom. The supported catalyst composition may comprise two or more catalyst compounds comprising a titanium, a zirconium, or a hafnium atom.

The catalyst compound may comprise:
(pentamethylcyclopentadienyl)(propylcyopentadienyl) $MX_2$,
(tetramethylcyclopentadienyl)(propylcyclopentadienyl) $MX_2$,
(tetramethylcyclopentadienyl)(butylcyclopentadieny $MX_2$,
$Me_2Si(indenyl)_2MX_2$,
$Me_2Si(tetrahydroindenyl)_2MX_2$, (n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
HN(CH$_2$CH$_2$N(2,4,6-Me$_3$phenyl))$_2$MX$_2$,
HN(CH$_2$CH$_2$N(2,3,4,5,6-Me$_5$phenyl))$_2$MX$_2$,
(propyl cyclopentadienyl)(tetramethylcyclopentadienyl) MX$_2$,
(butyl cyclopentadienyl)$_2$MX$_2$,
(propyl cyclopentadienyl)$_2$MX$_2$, and mixtures thereof,
wherein M is Zr or Hf, and X is selected from F, Cl, Br, I, Me, benzyl, CH$_2$SiMe$_3$, and C$_1$ to C$_5$ alkyls or alkenyls.

The supported catalyst composition may comprise any combination of the hereinbefore disclosed features.

The supported catalyst compositions disclosed herein exhibit more consistent properties, such that flowability, particle size, and bulk density have less variance than for catalyst compositions prepared by prior processes. Additionally, the supported catalyst compositions flow more easily at elevated operating temperatures and are capable of operating in a polymerization process continuously with enhanced reactor operability.

There is also provided a method for producing a supported catalyst composition for olefin polymerization comprising the steps of:
 a) forming a suspension comprising one or more particulate supports, one or more catalyst compounds and one or more activator compounds in one or more liquid diluents; and
 b) drying the suspension to form the supported catalyst composition;
wherein step b) is performed at a pressure which is greater than or equal to the vapor pressure of the one or more diluents.

The suspension may comprise one liquid diluent. The liquid diluent may comprise an aliphatic or aromatic hydrocarbon. The liquid diluent may comprise toluene.

The drying may be performed under conditions wherein substantially no gas bubbles of diluent are formed within the pores of the support particles.

The drying may be performed at a temperature of less than or equal to 70° C., or less than or equal to 65° C., or less than or equal to 60° C., or less than or equal to 55° C., or less than or equal to 50° C., or less than or equal to 45° C.

The drying may be performed at a pressure of less than or equal to 2 psia, or less than or equal to 3 psia, or less than or equal to 4 psia, or less than or equal to 5 psia, or less than or equal to 6 psia, or less than or equal to 8 psia.

The supported catalyst composition formed by the hereinbefore disclosed method may have a macro pore volume of less than or equal to 1.23 cm$^3$/g. The macro pore volume may be determined using mercury intrusion porosimetry according to ISO 15901-1.

The supported catalyst composition formed by the hereinbefore disclosed method may have a macro pore volume of less than or equal to 1.20 cm$^3$/g, or less than or equal to 1.10 cm$^3$/g, or less than or equal to 1.00 cm$^3$/g or less than or equal to 0.9 cm$^3$/g.

The supported catalyst composition formed by the hereinbefore disclosed method may have an average macro pore width of less than or equal to 5 μm.

The supported catalyst composition formed by the hereinbefore disclosed method may have an average macro pore width of less than or equal to 3 μm, or less than or equal to 2 μm, or less than or equal to 1 μm, or less than or equal to 0.5 μm.

The supported catalyst composition formed by the hereinbefore disclosed method may have a tapped bulk density of greater than or equal to 0.30 g/cm$^3$, or greater than or equal to 0.35 g/cm$^3$, or greater than or equal to 0.40 g/cm$^3$ or greater than or equal to 0.45 g/cm$^3$.

The particulate support may be a particulate Group 2, 3, 4, 5, 13 and 14 oxide or chloride. The particulate support may be a particulate silica. The particulate support may be dehydrated at an elevated temperature.

The particulate support may have an average particle size in the range of from about 0.1 to about 500 μm, or from about 1 to about 200 μm, or from about 1 to about 50 μm, or from about 5 to about 50 μm.

The one or more activator compounds may be an organometallic compound. The one or more activator compounds may be an alumoxane or a neutral or ionic stoichiometric activator. The one or more activator compounds may be methylalumoxane or modified methylalumoxane.

The supported catalyst composition formed by the hereinbefore disclosed method may have a ratio of Al/Si on the external surface area of the support to Al/Si on the internal surface area of the support of less than or equal to 3.0, or less than or equal to 2.5.

The one or more catalyst compounds may comprise a titanium, a zirconium, or a hafnium atom. The supported catalyst composition may comprise two or more catalyst compounds comprising a titanium, a zirconium, or a hafnium atom.

The catalyst compound may comprise:
 (pentamethylcyclopentadienyl)(propylcyclopentadienyl) MX$_2$,
 (tetramethylcyclopentadienyl)(propylcyclopentadieny) OMX$_2$,
 (tetramethylcyclopentadienyl)(butylcyclopentadieny) OMX$_2$,
 Me$_2$Si(indenyl)$_2$MX$_2$,
 Me$_2$Si(tetrahydroindenyl)$_2$MX$_2$,
 (n-propyl cyclopentadienyl)$_2$MX$_2$,
 (n-butyl cyclopentadienyl)$_2$MX$_2$,
 (1-methyl, 3-butyl cyclopentadienyl)$_2$MX$_2$,
 HN(CH$_2$CH$_2$N(2,4,6-Me$_3$phenyl))$_2$MX$_2$,
 HN(CH$_2$CH$_2$N(2,3,4,5,6-Me$_5$phenyl))$_2$MX$_2$,
 (propylcyclopentadienyl)(tetramethylcyclopentadienyl) MX$_2$,
 (butyl cyclopentadienyl)$_2$MX$_2$,
 (propyl cyclopentadienyl)$_2$MX$_2$, and mixtures thereof,
wherein M is Zr or Hf, and X is selected from F, Cl, Br, I, Me, benzyl, CH$_2$SiMe$_3$, and C$_1$ to C$_5$ alkyls or alkenyls.

The method may comprise any one or more of the hereinbefore disclosed features in any combination.

There is also provided a process for polymerizing olefins, the process comprising: contacting olefins with one or more supported catalyst compositions as hereinbefore disclosed in a reactor under polymerization conditions to produce an olefin polymer or copolymer.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, transition metal compounds, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the"

include plural referents unless otherwise specified. Thus, for example, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Disclosed herein are supported catalyst compositions for the polymerization of olefins which exhibit advantageous flow characteristics. The catalyst compositions may be characterized by having low macro pore volume, high bulk density and enhanced uniformity of active catalyst components across a particle. The supported catalyst compositions may be prepared by controlling the temperature and pressure of catalyst composition drying during manufacture and are capable of operating in a polymerization process continuously with good productivity.

Catalysts

Any catalyst or combination of catalysts utilized to polymerize olefins is suitable for use in the methods of the present disclosure. The following is a discussion of various catalysts set forth for the purpose of explanation and not limitation.

General Definitions

As used herein, a "supported catalyst composition" includes one or more catalyst compounds utilized to polymerize olefins and at least one activator or, alternatively, at least one cocatalyst, and at least one support. The supported catalyst composition may include any suitable number of catalyst compounds in any combination as described herein, as well as any activator or cocatalyst in any combination as described herein. A "supported catalyst composition" may also contain one or more additional components known in the art to reduce or eliminate reactor fouling such as continuity additives.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto.

Conventional Catalysts

Conventional catalysts are those traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to transition metal compounds from Groups III to VIII of the Periodic Table of the Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436. The conventional-type transition metal catalysts of the invention may also have the general formula $M'_1M''X_{2t}Y_u E$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, $-NR_2$, $-OR$, $-SR$, $-COOR$, or $-OSOOR$, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2Cl_{12}7CH_3COOC_2H_5$, $MgTiCl_5 \cdot 6C_2H_5OH$, $MgTiCl_5.100CH_3OH$, $MgTiCl_5$ tetrahydrofuran, $MgTi_2Cl_{12}7C_6H_5CN$, $MgTi_2Cl_{12}6C_6H_5COOC_2H_5$, $MgTiCl_62CH_3COOC_2H_5$, $MgTiCl_6 6C_5H_5N$, $MgTiCl_5(OCH_3)_2CH_3COOC_2H_5$, $MgTiCl_5N(C_6H_5)_2$ $3CH_3COOC_2H_5$, $MgTiBr_2Cl_42(C_2H_5)O$, $MnTiCl_5 4C_2H_5OH$, $Mg_3V_2Cl_{12} \cdot 7CH_3COOC_2H_5$, $MgZrCl_6$ 4tetrahydrofuran. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Conventional Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IHA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221, 002 and 5,093,415.

Metallocene Catalysts

Metallocene catalysts may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst compound(s)."

The one or more metallocene catalyst compounds may be represented by the formula (I):

$$Cp^ACp^BMX_n \qquad (I)$$

The metal atom "M" of the metallocene catalyst compound, as described throughout the specification and claims, may be selected from the group consisting of Groups 3 through 12 atoms and lanthanide Group atoms; selected from the group consisting of Groups 4, 5 and 6 atoms; Ti, Zr, Hf atoms, or Zr. The groups bound the metal atom "M" are such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, or either 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. $Cp^A$ and $Cp^B$ may be independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. Two adjacent R groups, when present, may be joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) may be independently selected from the group consisting of: any leaving group, for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. X may also be $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. X may also be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls. X may also be selected from hydride, chloride, fluoride, methyl, phenyl, phenoxy, benzoxy, tosyl, fluoromethyls and fluorophenyls. X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. X may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$,  $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. The bridged metallocene catalyst compound of formula (II) may have two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

The bridging group (A) may also be cyclic, comprising, for example 4 to 10, 5 to 7 ring members. The ring members may be selected from the elements mentioned above, from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents may be selected from the group consisting of hydrocarbyl (e.g., alkyl such as methyl) and halogen (e.g., F, Cl). The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) may be different from each other or the same as each other.

The metallocene catalyst compounds may include mono-ligand metallocene compounds (e.g., mono cyclopentadienyl catalyst components) such as described in WO 93/08221 for example which is incorporated herein by reference.

The at least one metallocene catalyst compound may be an unbridged "half sandwich" metallocene represented by the formula (IV):

wherein $Cp^A$ is defined as for the Cp groups in (I) and is a ligand that is bonded to M; each Q is independently bonded to M; Q is also bound to $Cp^A$; X is a leaving group as described above in (I); n ranges from 0 to 3, or is 1 or 2; q ranges from 0 to 3, or is 1 or 2. $Cp^A$ may be selected from the group consisting of cyclopentadienyl, indenyl, tetrahydroindenyl, fluorenyl, substituted version thereof, and combinations thereof.

In formula (IV), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

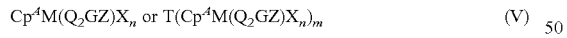

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n may be 1 or 2;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(Q_2GZ)X_n$" groups, and is chemically bonded to the $Cp^A$ groups;

m may be an integer from 1 to 7; or m may be an integer from 2 to 6.

The metallocene catalyst compound may be described more particularly in structures (VIa), (VIb), (VIc), (VId), (VIe), and (VIf):

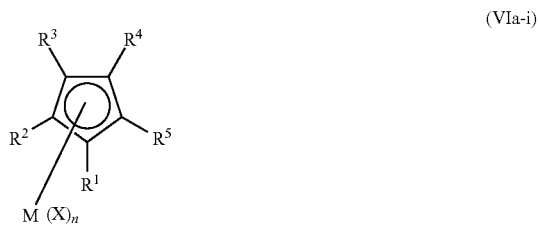

(VIa-i)

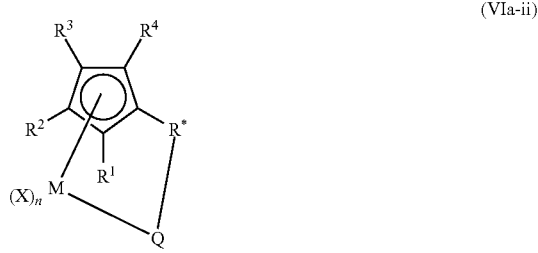

(VIa-ii)

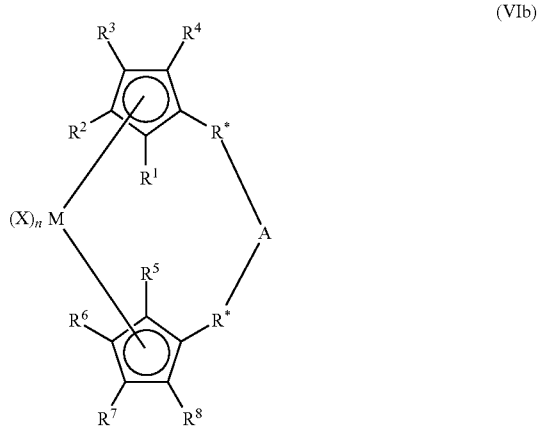

(VIb)

-continued

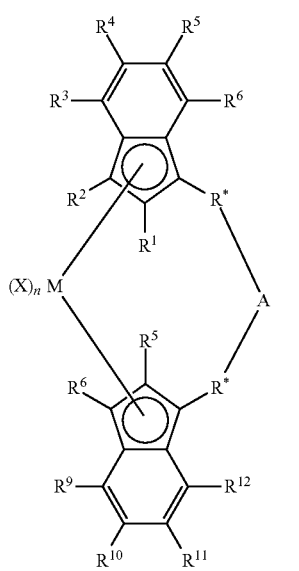

(VIc)

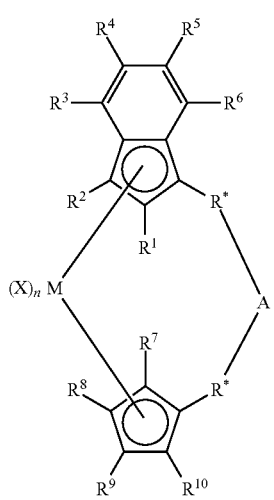

(VId)

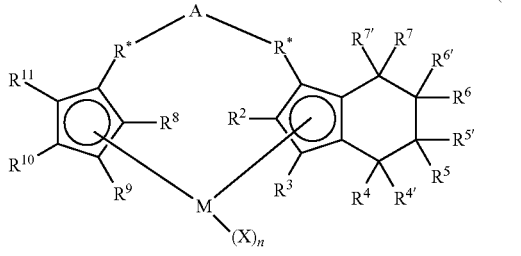

(VIe)

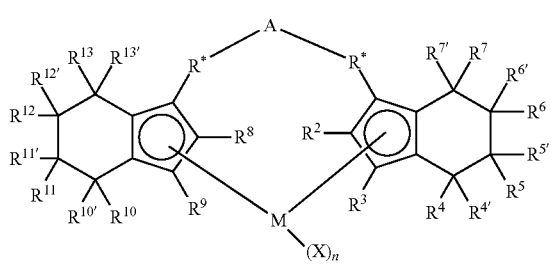

(VIf)

wherein in structures (VIa) to (VIf), M is selected from the group consisting of Group 3 to Group 12 atoms, selected from the group consisting of Group 3 to Group 10 atoms, selected from the group consisting of Group 3 to Group 6 atoms, selected from the group consisting of Group 4 atoms, selected from the group consisting of Zr and Hf or is Zr; wherein Q in (VIa) to (VIf) is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms; wherein R* may be selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additionally, R* may be from the group of divalent hydrocarbylenes and heteroatom-containing hydrocarbylenes, selected from the group consisting of alkylenes, substituted alkylenes and heteroatom-containing hydrocarbylenes, selected from the group consisting of $C_1$ to $C_{12}$ alkylenes, $C_1$ to $C_{12}$ substituted alkylenes, and $C_1$ to $C_{12}$ heteroatom-containing hydrocarbylenes, or selected from the group consisting of $C_1$ to $C_4$ alkylenes. Both R* groups may be identical in structures (VIf).

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups; or selected from the group consisting of $C_5$ to $C_8$ cyclic hydrocarbons, —CH$_2$CH$_2$—, =CR$_2$ and =SiR$_2$; wherein R is selected from the group consisting of alkyls, cycloalkyls, aryls, alkoxys, fluoroalkyls and heteroatom-containing hydrocarbons; R is selected from the group consisting of $C_1$ to $C_6$ alkyls, substituted phenyls, phenyl, and $C_1$ to $C_6$ alkoxys; or R is selected from the group consisting of methoxy, methyl, phenoxy, and phenyl; or A may be absent, in which case each R* is defined as for $R^1$-$R^{13}$; each X is as described above in (I); n is an integer from 0 to 4, or from 1 to 3, or from 1 or 2; and $R^1$ through $R^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos. through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls; or hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by (VIa) may take on many forms such as disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213.

For the metallocene represented in (VId), $R^1$ and $R^2$ form a conjugated 6-membered carbon ring system that may or may not be substituted.

It is contemplated that the metallocene catalysts compounds described above include their structural or optical or enantiomeric isomers (racemic mixture), or may be a pure enantiomer.

As used herein, a single, bridged, asymmetrically substituted metallocene catalyst compound having a racemic and/or meso isomer does not, itself, constitute at least two different bridged, metallocene catalyst compounds.

The "metallocene catalyst compound" may comprise any combination of the above described features.

Metallocene compounds and catalysts are known in the art and any one or more may be utilized herein. Suitable metallocenes include but are not limited to all of the metallocenes disclosed and referenced in the U.S. Patents cited above, as well as those disclosed and referenced in U.S. Pat. Nos. 7,179,876, 7,169,864, 7,157,531, 7,129,302, 6,995,109, 6,958,306, 6,884,748, 6,689,847, U.S. Patent Application publication number 2007/0055028, and published PCT Application Nos. WO 97/22635, WO 00/699/22, WO 01/30860, WO 01/30861, WO 02/46246, WO 02/50088, WO 04/026921, and WO 06/019494, all fully incorporated herein by reference. Additional catalysts suitable for use herein include those referenced in U.S. Pat. Nos. 6,309,997, 6,265,338, U.S. Patent Application publication number 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Group 15-Containing Catalysts

The supported catalyst composition may include one or metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. The Group 15-containing catalyst component may be a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

The Group 15-containing catalyst components may include Group 4 imino-phenol complexes, Group 4 bis (amide) complexes, and Group 4 pyridyl-amide complexes that are active towards olefin polymerization to any extent.

The Group 15-containing catalyst components may include $HN(CH_2CH_2N(2,4,6-Me_3phenyl))_2MX_2$, and $HN(CH_2CH_2N(2,3,4,5,6-Me_5phenyl))_2MX_2$, wherein M is Zr or Hf, and X is selected from F, Cl, Br, I, Me, benzyl, $CH_2SiMe_3$, and $C_1$ to $C_5$ alkyls or alkenyls.

The Group 15-containing catalyst component may include a bisamide compound such as $[(2,3,4,5,6\ Me_5C_6)NCH_2CH_2]_2NHZrBz_2$.

Mixed Catalysts

Additionally one type of catalyst compound described above can be combined with another type of catalyst compound described herein with one or more activators or activation methods described below.

It is further contemplated that other catalysts can be combined with the metallocene catalyst compounds described herein. For example, see U.S. Pat. Nos. 4,937,299, 4,935,474, 5,281,679, 5,359,015, 5,470,811, and 5,719,241.

Additionally, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210, 559, 4,263,422, 4,672,096, 4,918,038, 5,198,400, 5,237,025, 5,408,015 and 5,420,090.

Activators and Activation Methods for Catalyst Compounds

An activator, or co-catalyst, is defined in a broad sense as any combination of reagents that increases the rate at which a transition metal compound oligomerizes or polymerizes unsaturated monomers, such as olefins. The catalyst compounds may be activated for oligomerization and/or polymerization catalysis in any manner sufficient to allow coordination or cationic oligomerization and/or polymerization.

Additionally, the activator may be a Lewis-base, such as for example, diethyl ether, dimethyl ether, ethanol, or methanol. Other activators that may be used include those described in WO 98/07515 such as tris (2,2'2"-nonafluorobiphenyl) fluoroaluminate.

Combinations of activators may be used. For example, alumoxanes and ionizing activators may be used in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes may also be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. A visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronapthyl boron metalloid precursor, polyhalogenated heteroborane anions (see, for example, WO 98/43983), boric acid (see, for example, U.S. Pat. No. 5,942,459) or combinations thereof, may also be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. The three substituent groups may be independently selected from the group of halogen, mono or multicyclic (including halosubstituted) aryls, alkyls, and alkenyl compounds and mixtures thereof or alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. The three groups may be halogenated, for example fluorinated, aryl groups. In yet other illustrative examples, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Supports

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like.

The support may possess an average particle size in the range of from about 0.1 to about 500 µm, or from about 1 to about 200 µm, or from about 1 to about 50 µm, or from about 5 to about 50 µm.

The support may have an average pore size in the range of from about 10 to about 1000 Å, or about 50 to about 500 Å, or 75 to about 350 Å.

The support may have a surface area in the range of from about 10 to about 700 m$^2$/g, or from about 50 to about 500 m$^2$/g, or from about 100 to about 400 m$^2$/g.

The support may have a pore volume in the range of from about 0.1 to about 4.0 cc/g, or from about 0.5 to about 3.5 cc/g, or from about 0.8 to about 3.0 cc/g.

The support, such as an inorganic oxide, may have a surface area in the range of from about 10 to about 700 m²/g, a pore volume in the range of from about 0.1 to about 4.0 cc/g, and an average particle size in the range of from about 1 to about 500 μm. Alternatively, the support may have a surface area in the range of from about 50 to about 500 m²/g, a pore volume of from about 0.5 to about 3.5 cc/g, and an average particle size of from about 10 to about 200 μm. The surface area of the support may be in the range from about 100 to about 400 m²/g, a pore volume of from about 0.8 to about 3.0 cc/g and an average particle size of from about 5 to about 100 μm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

Supported Catalyst Compositions and Methods of Preparation

The supported catalyst compositions disclosed herein may comprise a particulate support as hereinbefore disclosed, one or more catalyst compounds as hereinbefore disclosed and one or more activator compounds as hereinbefore disclosed.

The one or more catalyst compounds may comprise a titanium, a zirconium, or a hafnium atom. The catalyst compound may comprise:

(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Me_5phenyl))_2MX_2$,
(propyl cyclopentadienyl)(tetramethylcyclopentadienyOMX$_2$,
(butyl cyclopentadienyl)$_2MX_2$,
(propyl cyclopentadienyl)$_2MX_2$, and mixtures thereof,
wherein M is Zr or Hf, and X is selected from F, Cl, Br, I, Me, benzyl, $CH_2SiMe_3$, and $C_1$ to $C_5$ alkyls or alkenyls.

The supported catalyst composition may comprise two or more catalyst compounds comprising a titanium, a zirconium, or a hafnium atom. The two or more catalyst compounds may comprise one or more metallocene compounds and one or more Group 15 containing metal compounds. The metallocene compound may comprise (pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
(propyl cyclopentadienyl)(tetramethylcyclopentadienyOMX$_2$,
(butyl cyclopentadienyl)$_2MX_2$,
(propyl cyclopentadienyl)$_2MX_2$, and mixtures thereof,
wherein M is Zr or Hf, and X is selected from F, Cl, Br, I, Me, benzyl, $CH_2SiMe_3$, and $C_1$ to $C_5$ alkyls or alkenyls.

The Group 15 metal containing compound may comprise $HN(CH_2CH_2N(2,4,6-Me_3phenyl))_2MX_2$ or $HN(CH_2CH_2N(2,3,4,5,6-Me_5phenyl))_2MX_2$, wherein M is Zr or Hf, and X is selected from F, Cl, Br, I, Me, benzyl, $CH_2SiMe_3$, and $C_1$ to $C_5$ alkyls or alkenyls.

The supported catalyst composition may comprise two catalyst compounds selected from:

(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
(propyl cyclopentadienyl)(tetramethylcyclopentadienyOMX$_2$,
(butyl cyclopentadienyl)$_2MX_2$ or
(propyl cyclopentadienyl)$_2MX_2$, and
$HN(CH_2CH_2N(2,4,6-Me_3phenyl))_2MX_2$ or
$HN(CH_2CH_2N(2,3,4,5,6-Me_5phenyl))_2MX_2$,
wherein M is Zr or Hf, and X is selected from the group consisting of F, Cl, Br, I, Me, benzyl, $CH_2SiMe_3$, and C1 to C5 alkyls or alkenyls.

The supported catalyst compositions may comprise a liquid diluent content of 7% or less, or 6% or less, or 5% or less, or 4% or less, or 3% or less. The supported catalyst compositions may comprise a toluene content of 7% or less, or 6% or less, or 5% or less, or 4% or less, or 3% or less.

The supported catalyst compositions may comprise a particulate silica, methylalumoxone, one or more catalyst compounds as hereinbefore described and a toluene content of 7% or less, or 6% or less, or 5% or less, or 4% or less, or 3% or less based on the total weight of the supported catalyst composition.

Advantageously, the supported catalyst compositions disclosed herein have a macro pore volume of less than or equal to 1.23 cm³/g. This compares to known supported catalyst compositions which have a macro pore volume greater than 1.23 cm³/g. A low macro pore volume may be indicative of improved dispersion of catalyst compounds and/or activator compounds within the internal pore structure of the supported catalyst particle. A high macro pore volume may be indicative of poorer dispersion of catalyst compounds and/or activator compounds within the internal pore structure of the support and a tendency for these compounds to shell on the outer surface of the support particles during catalyst preparation.

Advantageously, the supported catalyst compositions disclosed herein have high tapped bulk density. Without wishing to be bound by theory a high bulk density is indicative of superior dispersion of catalyst compounds and/or activator compounds within the internal pore structure of the supported catalyst particle and less tendency for these compounds to shell on the outer surface of the support particles during catalyst preparation. This may result in superior packing of supported catalyst particles leading to the observed high bulk density.

Advantageously, the supported catalyst compositions disclosed herein have excellent flowability likely as a consequence of having improved dispersion of catalyst compounds and/or activator compounds within the internal pore structure of the supported catalyst particle and less tendency for these compounds to shell on the outer surface of the support particles during catalyst preparation.

Advantageously, the supported catalyst compositions disclosed herein operate well in polymerization reactions and have a reduced tendency to form 'hot-spots' on a catalyst particle surface, likely as a consequence of having improved dispersion of catalyst compounds and/or activator compounds within the internal pore structure of the supported catalyst particle and less tendency for these compounds to shell on the outer surface of the support particles during catalyst preparation.

The surface of a support particle over which the catalyst compounds and/or activator compounds are dispersed includes the internal surface of the support but also includes dispersion over the external surface, which is considerably smaller. The dispersion will be present on those surfaces of the particle which are accessible to catalyst components. A most preferred catalyst composition will contain highly dispersed catalyst components, all or substantially all of which are located in the internal surface of the support rather than on the exterior surface thereof. The location of catalyst components can be inferred from X-ray Photoelectron Spectroscopy (XPS), Low Voltage Scanning Electron Microscopy (LVSEM), High Resolution Analytical Electron Microscopy (AEM) measurements, as well as directly measured by Secondary Ion Mass Spectroscopy (SIMS), all of which are well known to those skilled in the respective arts.

One way to quantify the above preferred catalysts is to measure the ratios of catalyst component elements to an element in the support, (hereafter "support element") such as silica.

For example, the aluminum (present in an activator compound) to support element ratio is determined by X-ray Photoelectron Spectroscopy (XPS) normalizing to hydrogen and metals. For example, for a silica support treated with alumoxane activator, the aluminum to silicon ratio would be measured by XPS for the silica supported alumoxane and a crushed sample of the silica supported alumoxane. The ratio of the noncrushed (Al:Si) to crushed (Al:Si) directly correlates to the ratio of aluminum to silicon outside the support particles over the aluminum to silicon ratio inside the support particles mentioned in the preceding paragraph. (The word "crushed" refers to a finely ground solid, such as one that has been ground by mortar and pestal to a fine powder.) For example, if the XPS data show that the concentration of silicon is 18.39% and the concentration of aluminum is 6.58% in the first sample that is not crushed then the ratio of aluminum to silicon in that sample is 6.58 divided by 18.39 which is 0.36. When the sample is crushed, if the XPS shows that there is now 18.91% silicon and 6.04% aluminum, the aluminum to silicon ratio in the crushed sample is 6.04 divided by 18.91 which is 0.32. The ratio of aluminum to silicon outside to aluminum to silicon inside is then determined by dividing 0.36 by 0.32 to come up with a final ratio of 1.12. For the purposes of this disclosure it is assumed that the aluminum measured in the crushed samples that is from the "external" surface of the support particle is negligible when included in the total aluminum.

Similar XPS data can be generated by methods known in the art for support materials other than silica and may be analyzed in the same manner as the silica example above. The preferred provision that the catalyst components be well dispersed over the surface of the particle implies that there is not preferential desposition of catalyst components on the external surface. In other words, it signifies that the catalyst components are substantially uniformly distributed throughout the internal and external surfaces of the particle. This uniform distribution is approached to the extent that the XPS measurements of the preferred catalyst composition indicate substantially no preferential disposition of the catalyst compound/alumoxane on the external surface of the support. Thus, this disclosure also provides for compositions comprising alumoxanes and supports and or alumoxane-transition metal complexes and supports having more alumoxanes on the inside than the outside. In particular the ratio of aluminum to support element outside to aluminum to support element inside should be about 3.0:1 or less, or about 2.5:1 or less, or about 1.5:1 or less, or about 1.0:1.0, or about 0.85:1.0 or less. In the event that non-silicon supports are used, then the element selected for XPS study and comparison as discussed above would be the metal of the group 2, 3, 4 or 5 metal oxide, the silica of the silicates or the carbon of the polyolefin. In the event different supports are combined, the selected elemental ratios should also be combined. In the special case of alumina supports, one could measure the relative amounts of aluminum to carbon, since alumina supports do not contain carbon and the alumoxanes do. In that case the relevant ratio would be the ratio of the carbon to aluminum outside the support to the ratio of the carbon to aluminum inside the support.

Methods for making the supported catalyst compositions may involve forming a suspension of one or more particulate supports, one or more catalyst compounds and one or more activator compounds in one or more liquid diluents, and then drying the suspension at temperatures at or above 20° C. and under controlled pressure conditions. The suspension may be formed by combining, blending, mixing, modifying or the like.

The supported catalyst composition may be formed by combining one or more catalyst compounds with one or more activator compounds and then combining the resulting mixture with one or more particulate supports. The supported catalyst composition may be formed by combining one or more activator compounds with one or more particulate supports and then combining the resulting mixture with one or more catalyst compounds. The components may be combined in the presence of a liquid diluent. The diluent employed in forming the suspension may be a material capable of dissolving or suspending the catalyst compound and the activator compound, and suspending the particulate support. For example, hydrocarbons such as linear or branched alkanes including n-hexane, n-pentane and isopentane; aromatics such as toluene and xylene; and halogenated hydrocarbons such as dichloromethane are useful as the diluent. The diluent may have a boiling point from about 0° C. to about 150° C.

The same or different diluents may be used for the catalyst compound and the activator compound.

In one method the activator may comprise an alumoxane, for example, methylalumoxane or modified methylalumoxane. In one method the diluent may comprise toluene.

The contact time for the one or more activators and one or more catalyst compounds may vary depending on one or more of the conditions of, temperature and pressure, the type of mixing apparatus, and the quantities of the components to be combined.

The combining of the one or more activators with one or more catalyst compounds may take place over a period from between about 1 minute and 2 hours.

After combining, the one or more activators and one or more catalyst compounds, the resulting mixture may be held for a period from between about 1 minute and 2 hours. The mixture may be held at a temperature from between 10° C. and 50° C., or from between 15° C. and 35° C.

The mixture of activator compounds and catalyst compounds may then be added to the particulate support. The particulate support may be slurried in a suitable liquid diluent prior to the addition. The liquid diluent may comprise toluene.

The combining of the mixture of one or more activators and one or more catalyst compounds with one or more particulate supports may take place over a period from about 1 minute to about 2 hours.

After combining, the of one or more activators, one or more catalyst compounds and one or more particulate supports, the mixture may be held for a period between about 1 minute and 2 hours. The mixture may be held at a temperature from between 10° C. and 50° C., or from between 15° C. and 35° C.

Drying of the catalyst composition to remove the liquid diluent may be performed at elevated temperature. The drying may be performed at a temperature of less than or equal to 70° C., or less than or equal to 65° C., or less than or equal to 60° C. or less than or equal to 55° C. or less than or equal to 50° C. or less than or equal to 45° C., or less than or equal to 40° C., or less than or equal to 35° C., or less than or equal to 30° C.

The drying may be performed under conditions of controlled pressure. The drying may be performed at a pressure of less than or equal to 2 psia, or less than or equal to 3 psia, or less than or equal to 4 psia, or less than or equal to 5 psia, or less than or equal to 6 psia, or less than or equal to 8 psia.

The drying may be performed at a temperature of less than or equal to 70° C. and at a pressure of less than or equal to 8 psia.

The drying may be performed at a temperature of less than or equal to 65° C. and at a pressure of less than or equal to 6 psia.

The drying may be performed at a temperature of less than or equal to 60° C. and at a pressure of less than or equal to 4 psia.

The drying may be performed under conditions of controlled pressure. The drying may be performed at a pressure greater than or equal to the vapor pressure of the diluent or diluents.

In any of the above embodiments the drying may be performed with an inert gas purge or sparge. The inert gas may be nitrogen.

In any of the above embodiments the drying may be performed by continuously agitating or mixing the supported catalyst suspension.

The amounts of catalyst compound and activator compound employed in the suspension of catalyst, activator and support material may depend on the nature of the activator. When the activator is a branched or cyclic alumoxane the mole ratio of aluminum atoms (from the activator) to transition metal (from the catalyst compound) in the suspension may be between about 10 and about 5000, or between about 50 to about 1000, or between about 100 to about 500.

The amount of particulate support employed in forming the suspension may be from about 1 to about 90 percent by weight, or from about 10 to about 80 percent by weight, or from about 20 to about 75 percent by weight, based on the total weight of the supported catalyst composition.

A feature of the method of preparation of the supported catalyst composition is that after forming a suspension comprising one or more particulate supports, one or more activator compounds and one or more catalyst compounds in one or more liquid diluents the suspension is dried to form the supported catalyst composition. Without wishing to be bound by theory it has been recognized that when drying is performed at higher temperatures and/or higher vacuum, bubbles of gaseous diluent are formed in the pores of the support in the suspension. This may occur when the pressure in the dryer is less than the vapor pressure of the diluents or diluent. This may result in catalyst compounds and/or activator compounds being solubilized and migrating to the outer surface of the support particles. By controlling the temperature/pressure profile during drying of the supported catalyst composition such migration may be minimized or reduced.

The suspension may be dried so that the liquid content of the supported catalyst composition is 7% by weight or less, or 5% by weight or less, or 4% by weight or less, or 3% by weight or less, or 2% by weight or less. The suspension may be dried so that the toluene content of the supported catalyst composition is 7% by weight or less, or 5% by weight or less, or 4% by weight or less, or 3% by weight or less, or 2% by weight or less.

In the method as disclosed herein the weight of solids in the suspension may be greater than 300 kg, or greater than 400 kg, or greater than 500 kg.

The suspension may have a weight percent of solids in the liquid diluent between about 5% by weight and about 60% by weight, or between about 10% by weight and about 50% by weight, or between about 20% by weight and about 40% by weight.

The particulate support may comprise a particulate Group 2, 3, 4, 5, 13 and 14 oxide or chloride. The particulate support may comprise a particulate silica. The particulate support may be dehydrated at an elevated temperature.

The particulate support may have an average particle size in the range of from about 0.1 to about 500 μm, or from about 1 to about 200 μm, or from about 1 to about 50 μm, or from about 5 to about 50 μm.

The supported catalyst composition may be retained in substantially dry and/or free flowing form or may be reslurried in a suitable liquid. The supported catalyst composition may be mixed with a suitable protective material such as mineral oil for storage.

Continuity Additives/Aids

It may also be desirable to use one or more continuity additives to, for example, aid in regulating static levels in polymerization reactors. The continuity additive may be used as a part of the supported catalyst composition or introduced directly into the reactor independently of the supported catalyst composition. The continuity additive may be supported on the inorganic oxide of the supported catalyst composition described herein.

Non-limiting examples of continuity additives include, amide-hydrocarbon or ethoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds.

Any of the aforementioned additional continuity additives may be employed either alone or in combination.

Other continuity additives useful in embodiments disclosed herein are well known to those in the art. Regardless of which continuity additives are used, care should be exercised in selecting an appropriate continuity additive to avoid introduction of poisons into the reactor. In addition, in selected embodiments, the smallest amount of the continuity additives necessary to bring the static charge into alignment with the desired range should be used.

The continuity additives may be added to the reactor as a combination of two or more of the above listed continuity additives. The continuity additive(s) may be added to the reactor in the form of a solution or a slurry, such as a slurry with a mineral oil, and may be added to the reactor as an individual feed stream or may be combined with other feeds prior to addition to the reactor. For example, the continuity additive may be combined with the supported catalyst or supported catalyst slurry prior to feeding the combined catalyst-static control agent mixture to the reactor.

The continuity additives may be added to the reactor in an amount ranging from about 0.05 to about 200 ppmw, or from about 2 to about 100 ppmw, or from about 2 to about 50 ppmw, based on the polymer production rate. The continuity additives may also be added to the reactor in an amount of about 2 ppmw or greater, based on the polymer production rate.

Methods of Using the Supported Catalyst Compositions

One skilled in the art recognizes that depending on the olefin polymerization composition used, certain conditions of temperature and pressure would be required to prevent, for example, a loss in the activity of the catalyst system.

The supported catalyst composition as hereinbefore disclosed may be introduced directly into the polymerization reactor as a substantially dry powder. The catalyst may be in the form of a slurry in a suitable liquid.

It will be appreciated that the exact method of introduction may vary depending on one or more of the conditions, temperature and pressure, the type of mixing apparatus, and the quantities of the components to be combined.

Polymerization Processes

Polymerization processes may include solution, gas phase, slurry phase and a high pressure process or a combination thereof. In illustrative embodiments, a gas phase or slurry phase polymerization of one or more olefins at least one of which is ethylene or propylene is provided. The reactor may be a gas phase fluidized bed polymerization reactor.

The supported catalyst compositions prepared by the methods as hereinbefore described are suitable for use in any prepolymerization and/or polymerization process over a wide range of temperatures and pressures. The temperatures may be in the range of from −60° C. to about 280° C., from 50° C. to about 200° C.; from 60° C. to 120° C. from 70° C. to 100° C. or from 80° C. to 95° C.

The olefin polymerization process may be a solution, high pressure, slurry or gas phase polymerization process of one or more olefin monomers having from 2 to 30 carbon atoms, preferably 2 to 12 carbon atoms, and more preferably 2 to 8 carbon atoms. The process is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the polymerization process include ethylenically unsaturated monomers, diolefins having 4 to 18 carbon atoms, conjugated or nonconjugated dienes, polyenes, vinyl monomers and cyclic olefins. Useful monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the present process, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the polymerization process, ethylene or propylene is polymerized with at least two different comonomers, optionally one of which may be a diene, to form a terpolymer.

The polymerization process may be directed to a polymerization process, particularly a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with one or more of the catalyst compositions as hereinbefore described in a reactor under polymerization conditions to produce the ethylene polymer or copolymer.

Suitable gas phase polymerization processes are described in, for example, U.S. Pat. Nos. 4,543,399, 4,588,790, 5,028,670, 5,317,036, 5,352,749, 5,405,922, 5,436,304, 5,453,471, 5,462,999, 5,616,661, 5,668,228, 5,627,242, 5,665,818, and 5,677,375, and European publications EP-A-0 794 200, EP-A-0 802 202, EP-A2 0 891 990, and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization process is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

1) Twenty grams of the catalyst sample to be measured was weighed into the 14 mm funnel with the bottom covered.
2) A stopwatch was started when the bottom cover was removed.
3) The stopwatch was stopped when the entire sample had passed through.
4) The stopwatch time was recorded and the procedure repeated using a smaller size funnel. If the catalyst did not flow through a certain sized funnel, no further tests using a smaller sized funnel were performed.

All manipulations for tapped bulk density and funnel flow tests were carried out inside a glove box under a nitrogen atmosphere.

Catalyst Preparation

In a 10 liter cone bottom stainless steel vessel equipped with a ribbon stirrer, 1900 ml dry toluene was added and the agitator started at 60 RPM. Then 1060 grams of 30 wt % MAO solution in toluene from Albemarle Corp. was added to the vessel. In a glass jar, dimethylsilyl-bis-tetrahydroindenyl zirconium dichloride from Albemarle Corp. (19.0 g) was mixed with toluene (581 g) with a stir bar. The slurry was poured into the mixer and agitation continued for 60 minutes at ambient temperature. The mixing speed was then increased to 120 RPM. Eight hundred fifty grams of ES70 or ES70X silica (PQ Corp) dehydrated at 600° C. was added to the mixer at a slow rate. The slurry was stirred at ambient for 25 minutes. Two hundred fifty ml of 10 wt % AS990 (Univation Technologies, contains 88 wt % Varonic S202 and 12 wt % syloid silica) solution in toluene or 9 wt % Varonic S202 (Evonik) solution in toluene was added slowly to the mixer. The catalyst slurry was stirred for another 30 minutes at ambient temperature. The final catalyst was vacuum dried with mechanical agitation under various temperature and pressure conditions. The details are collected in Table 1, along with the results of tapped bulk density and flowability.

TABLE 1

| Example | Silica Support | Drying Temp. ° C. | Vacuum, inch Hg (measured outside the vessel) | Tapped Catalyst Bulk Density, g/cm$^3$ | Flowability [the numbers indicate which funnel opening (mm) the catalyst flowed through] |
|---|---|---|---|---|---|
| A | ES70 | 70 | 30 | 0.29 | No Flow |
| B | ES70 | 70 | 30 | 0.29 | No Flow |
| C | ES70 | 65 | 30 | 0.35 | No Flow |
| D | ES70 | 65 | 30 | 0.35 | No Flow |
| E | ES70 | 60 | 30 | 0.35 | 12, 14 |
| F | ES70 | 55 | 30 | 0.35 | No Flow |
| G | ES70X | 55 | 28.5 | 0.39 | 7, 10, 12, 14 |
| H* | ES70 | 45 | 18* | 0.45 | 12, 14 |
| I | ES70 | 55 | 28 | 0.41 | 7, 10, 12, 14 |

*Note:
This catalyst was dried in a Rota-vap., no mechanical agitation was used, the vacuum was measured in the vessel.

Tapped Catalyst Bulk Density Measurement

About 10 grams of supported catalyst composition was poured into a 50 ml graduated cylinder. The lower part of cylinder was tapped with a wooden stick at least 50 times until the solid level was constant. Tapped bulk density was calculated from the weight of catalyst divided by the final volume.

Funnel Flow Fest on Supported Catalyst Composition

The following procedure outlines the steps followed to measure supported catalyst composition flowability using the funnel test. The funnel sizes used were 14, 12, 10 and 7 mm opening. The steps were as follows:

The results indicate that supported catalyst compositions dried at lower temperature and/or higher pressure advantageously have improved flowability and higher tapped bulk density. The catalysts having improved flowability and higher bulk density likely have less activator and catalyst compounds located on the exterior surface of the support particles.

XPS Analysis on Metal Distribution

The supported catalyst compositions were analyzed (uncrushed and crushed) by XPS and the results are shown in Table 2.

TABLE 2

|  | Uncrushed Cat | | | Crushed Cat | | | AlSi Uncrushed/ |
| --- | --- | --- | --- | --- | --- | --- | --- |
| Examples | Al | Si | Al/Si | Al | Si | Al/Si | Crushed |
| A | 12.13 | 11.26 | 1.08 | 6.15 | 18.61 | 0.33 | 3.26 |
| B | 11.64 | 8.98 | 1.30 | 6.91 | 16.34 | 0.42 | 3.07 |
| C | 13.7 | 9.18 | 1.49 | 8.11 | 16.21 | 0.50 | 2.98 |
| D | 11.62 | 12.07 | 0.96 | 5.53 | 17.46 | 0.32 | 3.04 |
| E | 11.48 | 13.02 | 0.88 | 6.11 | 20.26 | 0.30 | 2.92 |
| F | 11.66 | 11.9 | 0.98 | 6.15 | 19.03 | 0.32 | 3.03 |
| G | 11.25 | 11.65 | 0.97 | 6.66 | 19.66 | 0.34 | 2.85 |
| H | 11.79 | 13.25 | 0.89 | 7.34 | 18.68 | 0.39 | 2.26 |
| I | 6.58 | 18.39 | 0.36 | 6.04 | 18.91 | 0.32 | 1.12 |

Referring to Table 2 a high value of 'Al/Si uncrushed/crushed' indicates that more Al is located on the exterior of a supported catalyst particle. A low value of 'Al/Si uncrushed/crushed' indicates that more Al is located in the interior pore structure of a supported catalyst particle. Supported catalyst compositions dried at lower temperature and/or higher pressure advantageously have lower values of 'Al/Si uncrushed/crushed' indicating that more Al is located in the interior pore structure of the supported catalyst particle.

The porosity of supported catalyst compositions, along with the dehydrated silica used to prepare the catalysts (ES70 dehydrated at 600° C. and having 1% by weight water content) was examined by mercury intrusion porosimetry according to ISO 15901-1. Macro and meso pore volumes were determined using a Micromeritics AutoPore V 9600 Mercury Porosimeter. The results are shown in Table 3.

TABLE 3

| Example | Total Intrusion Volume @ 60K psia cm³/g | Macro Pore Size μm | Meso Pore Size Å | BD at 0.53 psia g/cm³ | Apparent Density @ 60K psia g/cm³ | Porosity % | Macro Pore Vol cm³/g | Meso Pore Vol cm³/g |
| --- | --- | --- | --- | --- | --- | --- | --- | --- |
| ES70-600° C. | 3.7193 | 4.93 | 102.0 | 0.2320 | 1.6938 | 86.30 | 2.00 | 1.72 |
| C | 2.1244 | 7.56 | 101.5 | 0.3741 | 1.8213 | 79.46 | 1.24 | 0.88 |
| I | 1.5447 | 0.315 | 96.5 | 0.4734 | 1.7612 | 73.12 | 0.80 | 0.75 |

The results indicate a clear difference between the macro pore volume of supported catalyst composition C, which was dried at 65° C., and supported catalyst composition I, which was dried at 55° C. The lower macro pore volume of catalyst I, compared to catalyst C, is indicative of superior dispersion of catalyst components (methylalumoxane and catalyst compounds) through the macro pores of a support particle. Both supported catalyst compositions, C and I, have lower macro pore volumes than the silica support ES-70.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present invention.

What is claimed is:

1. A supported olefin polymerization catalyst composition comprising one or more particulate supports, one or more catalyst compounds, a continuity additive and one or more activator compounds, wherein the supported catalyst composition has a ratio of Al/Si on an external surface area of the support to Al/Si on an internal surface area of the support that is less than or equal to 3.0, and is formed by drying a suspension including the one or more particulate supports, the one or more catalyst compounds, the continuity additive, the one or more activator compounds, and a diluent and has a macro pore volume, as determined by ISO 15901-1, of less than or equal to 1.23 cm³/g, wherein the drying is performed at a temperature of less than or equal to 65° C. and at a pressure that is less than or equal to 8 psia.

2. A supported olefin polymerization catalyst composition according to claim 1, wherein the supported catalyst composition has a macro pore volume of less than or equal to 1.20 cm³/g, or less than or equal to 1.10 cm³/g, or less than or equal to 1.00 cm³/g.

3. A supported olefin polymerization catalyst composition according to claim 1, wherein the supported catalyst composition has a tapped bulk density of greater than or equal to 0.30 g/cm³, or greater than or equal to 0.35 g/cm³, or greater than or equal to 0.40 g/cm³ or greater than or equal to 0.45 g/cm³.

4. A supported olefin polymerization catalyst composition according to claim 1, wherein the particulate support is a particulate Group 2, 3, 4, 5, 13 and 14 oxide or chloride.

5. A supported olefin polymerization catalyst composition according to claim 4, wherein the particulate support is a particulate silica.

6. A supported olefin polymerization catalyst composition according to claim 5, wherein the particulate support has an average particle size in the range of from about 0.1 to about 500 μm, or from about 1 to about 200 μm, or from about 1 to about 50 μm, or from about 5 to about 50 μm.

7. A supported olefin polymerization catalyst composition according to claim 1, wherein the one or more activator compounds is an alumoxane or a neutral or ionic stoichiometric activator.

8. A supported olefin polymerization catalyst composition according to claim 1, wherein the one or more activator compounds is a methylalumoxane or modified methylalumoxane.

9. A supported olefin polymerization catalyst composition according to claim 1, wherein the one or more catalyst compounds comprise a titanium, a zirconium, or a hafnium atom.

10. A supported olefin polymerization catalyst composition according to claim 1, wherein the catalyst compound comprises:

(pentamethylcyclopentadienyl)(propylcyclopentadienyl)MX$_2$, (tetramethylcyclopentadienyl)(propylcyclopentadienyl) MX$_2$,
(tetramethylcyclopentadienyl)(butylcyclopentadienyl) MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
HN(CH$_2$CH$_2$N(2,4,6-Me$_3$phenyl))$_2$MX$_2$,
HN(CH$_2$CH$_2$N(2,3,4,5,6-Me$_5$phenyl))$_2$MX$_2$,
(propylcyclopentadienyl)(tetramethylcyclopentadienyl) MX$_2$,
(butyl cyclopentadienyl)$_2$MX$_2$,
(propyl cyclopentadienyl)$_2$MX$_2$, and mixtures thereof, wherein M is Zr or Hf, and X is selected from F, Cl, Br, I, Me, benzyl, CH$_2$SiMe$_3$, and C$_1$ to C$_5$ alkyls or alkenyls.

11. A process for polymerizing olefins, the process comprising: contacting olefins with one or more supported catalyst compositions according to claim 1 in a reactor under polymerization conditions to produce an olefin polymer or copolymer.

12. A method for producing a supported olefin polymerization catalyst composition comprising the steps of:
a) forming a suspension comprising one or more particulate supports, one or more catalyst compounds, a continuity additive, and one or more activator compounds in one or more liquid diluents; and
b) drying the suspension to form the supported catalyst composition;
wherein the supported catalyst composition has a ratio of Al/Si on an external surface area of the support to Al/Si on an internal surface area of the support that is less than or equal to 3.0, and a macro pore volume, as determined by ISO 15901-1, of less than or equal to 1.23 cm$^3$/g and step b) is performed at a temperature of less than or equal to 65° C. and at a pressure which is greater than or equal to the vapor pressure of the one or more diluents, wherein the pressure is less than or equal to 8 psia.

13. A method according to claim 12 wherein substantially no gas bubbles of diluent are formed in the pores of the support.

14. A method according to claim 13, wherein the drying is performed at a temperature of less than or equal to 60° C., or less than or equal to 55° C., or less than or equal to 50° C., or less than or equal to 45° C.

15. A method according to claim 12, wherein the drying is performed at a pressure of less than or equal to 2 psia, or less than or equal to 3 psia, or less than or equal to 4 psia, or less than or equal to 5 psia, or less than or equal to 6 psia, or less than or equal to 8 psia.

16. A method according to claim 12, wherein the supported catalyst composition has a macro pore volume of less than or equal to 1.20 cm$^3$/g, or less than or equal to 1.10 cm$^3$/g, or less than or equal to 1.00 cm$^3$/g.

17. A method according to claim 12, wherein the supported catalyst composition has a tapped bulk density of greater than or equal to 0.30 g/cm$^3$, or greater than or equal to 0.35 g/cm$^3$, or greater than or equal to 0.40 g/cm$^3$ or greater than or equal to 0.45 g/cm$^3$.

18. A method according to claim 12, wherein the catalyst compound comprises:
(pentamethylcyclopentadienyl)(propylcyclopentadienyl) MX$_2$,
(tetramethylcyclopentadienyl)(propylcyclopentadienyl) MX$_2$,
(tetramethylcyclopentadienyl)(butylcyclopentadienyl) MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
HN(CH$_2$CH$_2$N(2,4,6-Me$_3$phenyl))$_2$MX$_2$,
HN(CH$_2$CH$_2$N(2,3,4,5,6-Me$_5$phenyl))$_2$MX$_2$,
(propyl cyclopentadienyl)(tetramethylcyclopentadienyl) MX$_2$,
(butyl cyclopentadienyl)$_2$MX$_2$,
(propyl cyclopentadienyl)$_2$MX$_2$, and mixtures thereof, wherein M is Zr or Hf, and X is selected from F, Cl, Br, I, Me, benzyl, CH$_2$SiMe$_3$, and C$_1$ to C$_5$ alkyls or alkenyls.

* * * * *